United States Patent [19]

Flaherty et al.

[11] 3,774,162

[45] Nov. 20, 1973

[54] LASER SCAN TESTING SYSTEM HAVING PATTERN RECOGNITION MEANS

[75] Inventors: John J. Flaherty, Elk Grove Village; Eric J. Strauts, Harwood Heights, both of Ill.

[73] Assignee: Magnaflux Corporation, Chicago, Ill.

[22] Filed: Mar. 1, 1972

[21] Appl. No.: 230,713

[52] U.S. Cl. .......... 340/172.5
[51] Int. Cl. .......... G11c 19/00, G01m 11/08
[58] Field of Search .......... 340/172.5

[56] References Cited

UNITED STATES PATENTS

| | | | |
|---|---|---|---|
| 3,540,004 | 11/1970 | Hansen | 340/172.5 |
| 3,581,281 | 5/1971 | Martin | 340/172.5 |
| 3,585,598 | 6/1971 | Hudson, Jr. et al. | 340/172.5 |
| 3,629,855 | 12/1971 | Conley | 340/172.5 |
| 3,580,656 | 5/1971 | Carson | 340/172.5 |
| 3,613,054 | 10/1971 | Ricard | 340/172.5 |
| 3,388,383 | 6/1968 | Shivdasani et al. | 340/172.5 |
| 3,274,566 | 9/1966 | McGrogan, Jr. | 340/172.5 |
| 3,267,435 | 8/1966 | Propster, Jr. | 340/172.5 |
| 3,544,967 | 12/1970 | Sallach et al. | 340/172.5 |
| 3,662,346 | 5/1972 | Tada | 340/172.5 |

*Primary Examiner*—Paul J. Henon
*Assistant Examiner*—Paul R. Woods
*Attorney*—Alberts, Brezina and Lund

[57] ABSTRACT

Non-destructive testing system in which a laser beam is impinged on an oscillating mirror to produce on a surface of a part a scanning spot moved in forward and reverse scan directions while the part is moved in a transverse direction. Photocell means respond to light from the surface of the part to develop defect-indicating information signals which are applied through band-pass filter and analog gate means to a main memory comprising a plurality of serially connected LSI shift-register units, the outputs of which are applied to shift-register sections of an auxiliary memory, each section comprising a plurality of stages. The stages of the auxiliary memory are connected to decoder circuitry including parallel to serial converters and pre-settable counter, to develop output signals in response to predetermined patterns. Clock signals for the memory are also applied to a sweep generator which generates a staircase signal applied to a drive system for the oscillating mirror.

26 Claims, 18 Drawing Figures

LASER SCAN TESTING SYSTEM HAVING PATTERN RECOGNITION MEANS

This invention relates to a laser scan testing system having pattern recognition means and more particularly to an improved system in which a part can be more rapidly and accurately scanned while the existence of any one of a large number of patterns of indications is automatically detected. The system is highly reliable in operation and is applicable to testing of a wide variety of types of parts.

A copending application of John J. Flaherty and Henry N. Nerwin, Ser. No. 875,304, filed Nov. 10, 1969, now U.S. Pat. No. 3,673,860, discloses a nondestructive testing system having pattern recognition means, in which a region of a part is scanned to produce defect-indicating information signals, the scanning being performed in successive generally parallel scans in a first direction, each of such scans being displaced in a second direction from a preceding scan in the first direction. The information signals are entered into a matrix of shift-register stages arranged electrically in rows and columns, each column corresponding to a scan in the first direction with the row position in each column corresponding to the position of the defect in the corresponding scan in the first direction. Pattern sensing means are provided for sensing coincidence of storage of information in predetermined ones of shift-register stages to thereby detect detects having predetermined configurations.

Another copending application of Donald T. O'Connor, Bruce C. Graham and David W. Prine, Ser. No. 27,741, filed Apr. 13, 1970, now abandoned, discloses a system using a laser beam to scan a part, scanning movement in one direction being effected through an ultrasonic beam deflection device and scanning movement in a transverse direction being effected either by a rotating mirror or by movement of the part. Defect-indicating signals developed by a photocell may be applied to a pattern recoginition system such as disclosed in the aforementioned application of John J. Flaherty and Henry N. Nerwin, Ser. No. 875,304.

The systems of the aforesaid applications have important advantages, including the fact that defects of various configurations can be automatically located while parts are scanned. This invention was evolved with the object of using the basic principles as disclosed in said copending applications and in effecting further improvements in the speed, accuracy and reliability with which parts can be tested, further improvements in resolution capabilities, further improvements in the pattern recognition circuitry and further improvements relating to the application of the system to parts of various configurations.

In a system constructed in accordance with the invention, scanning of a part for inhomogeneities is performed in successive generally parallel scans in a first direction with each scan in the first direction being displaced in a second direction from the preceding scan in the first direction. Information signals developed during the scans are applied to a main memory including a plurality of shift-register sections of equal capacity connected in cascade. A certain number of clock pulses are applied to the main memory during each scan in the first direction, such that after a number of scans equal to the number of shift-register sections, and at an instant of time corresponding to the end of one scan, information is electrically stored in patterns corresponding to the patterns of inhomogeneities in the part. Decoder means are coupled to the memory and, for example, may detect the simultaneous exit of information signals from all the sections of the main memory, to thereby detect any inhomogeneity which is disclosed along a line transverse to the first scanning direction (or parallel to the second scanning direction) and which has a length corresponding to a number of scans equal to the number of shift-register sections.

In this combination, the serial connection of the shift-register sections is advantageous in itself in eliminating parallel connections and parallel transfer operations. It is particularly advantageous in that the main memory can utilize LSI (large scale integrated) circuits of relatively inexpensive commercially available types in which a large number of stages, 200 for example, can be incorporated in a single chip. Since each stage corresponds to an incremental area of the part, the system can have very high resolution.

In accordance with another very important feature of the invention, an auxiliary memory is provided comprising a plurality of shift-register sections respectively connected to the outputs of the main memory shift-register sections, each of the sections of the auxiliary memory comprising a plurality of stages, with decoder means being connected to the shift-register stages of the auxiliary memory. With this feature, it is possible to detect any one of a large number of patterns, by selection of the connections to the decoder, including a straight line patterns parallel to the second scan direction and a number of other patterns limited only by the number of stages in the shift-register sections of the auxiliary memory. In most practical applications, a large number of stages are not required and the number of stages in each auxiliary memory shift-register section may be a small fraction of the number of stages in each main memory shift-register sections.

In operation, a relatively small portion of the part is closely examined following each clock signal and the portion examined is continually shifted in response to the clock signals. The effect is to obtain a very high resolution capability, by virtue of the use of a large number of stages in the main memory shift-register sections, without requiring a large number of stages to which individual circuit connections must be made.

A further important feature of the invention relates to the provision of decoder means having a parallel connection to memory shift-register stages and operative to develop a corresponding serial train of pulses, applied to counter means operative to develop an output signal in response to application of a certain number of pulses thereto. Preferably, the counter means are adjustable to permit adjustment of the number of pulses required to produce an output signal. With this arrangement, the system may be readily adjusted according to the practical requirements of a given testing operation.

Specific features relate to the circuitry of the decoder means, the generation of sample pulses for application thereto, and the arrangement of connections such as to permit detection of a large number of patterns with a minimum number of connections.

Another important feature of the invention relates to the synchronization of the scanning operation with the operation of the memory means. In accordance with this feature, a sweep generator responds to clock signals to generate a periodic sawtooth signal including forward and reverse direction portions with each forward portion being a staircase function corresponding to the application of a predetermined number of clock signals, the sawtooth signal being applied to electromechanical drive means to oscillate a mirror and to move a laser beam spot in forward and reverse directions.

According to a specific feature, forward gate means are provided for applying information signals only during time periods corresponding to the application of the forward direction portions of the sawtooth signal.

Another specific feature is in the provision of delay means associated with the forward gate means for introducing a certain delay between the time of generation of the forward direction portions of the sawtooth and the application of the information signals to the memory, to compensate for a phase delay between the sawtooth and the corresponding movement of the mirror due to inertial effects in the electromechanical drive.

In one preferred embodiment, only the information signals developed during the forward scan direction are used, which simplifies the system. In another preferred embodiment, the sweep generator means is reversible upon each application of a certain number of clock signals and each of the reverse direction portions of the sawtooth is a staircase function. Delay shift-register means respond to forward scan direction information signals and reversible shift-register means respond to reverse direction information signals, the reversible shift-register means being operative to feed out information in reverse order. The outputs of the delay shift-register means and the reversible shift-register means are combined and applied to the memory. With this arrangement, the resolution capabilities, for a given scan range, are effectively doubled.

Additional important features relate to the provision of adjustable band-pass filter means for processing signals, and to the provision of analog gate means for developing pulses for application to the memory.

This invention contemplates other objects, features and advantages which will become more fully apparent from the following detailed description taken in conjunction with the accompanying drawings which illustrate preferred embodiments and in which:

FIG. 1 diagrammatically illustrates a laser scan testing system according to the invention;

FIG. 2 diagrammatically illustrates main and auxiliary memory portions of the system of FIG. 1 and the location of information stored in the auxiliary memory at a certain point in time;

FIG. 3 illustrates the path of a scanning spot over the surface of a part having certain defects therein;

FIG. 4 diagrammatically illustrates the auxiliary memory portion of the system and the location of stored information at a point in time later than the point in time presented in FIG. 2;

Figure 9:
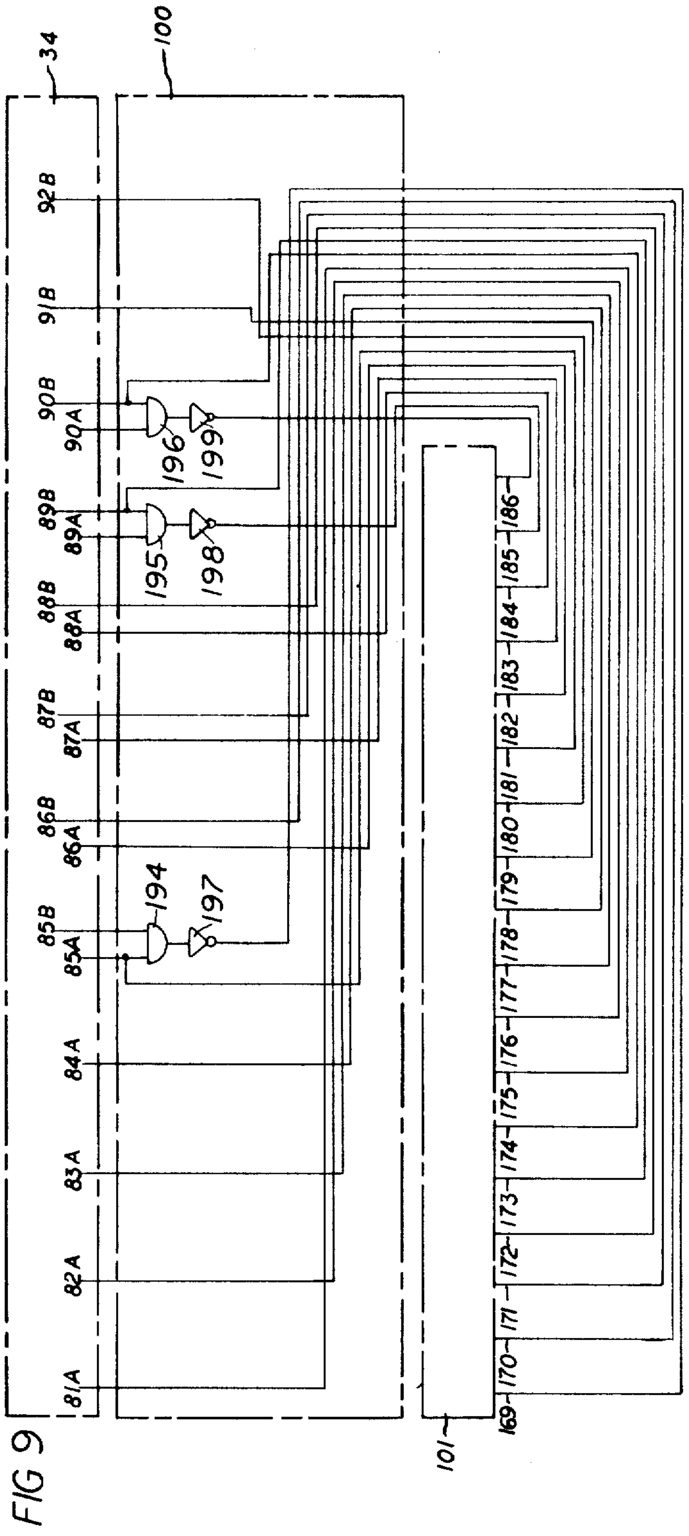
FIG. 9 is a circuit diagram showing interconnections between auxiliary shift-register units and the decoder board illustrated in FIG. 8.
Figure 11:
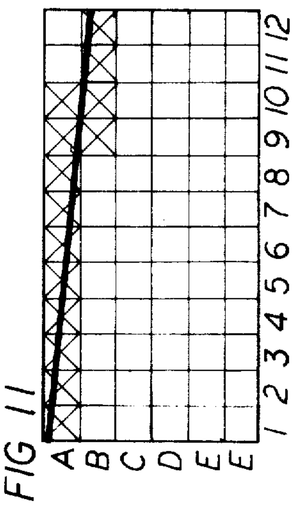
Figure 10:
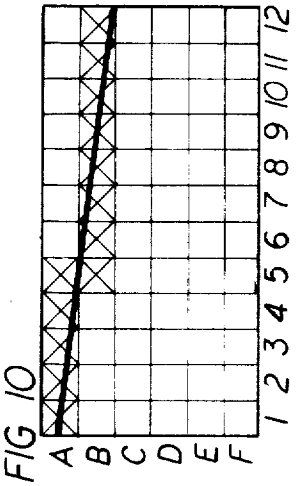
Figure 12:
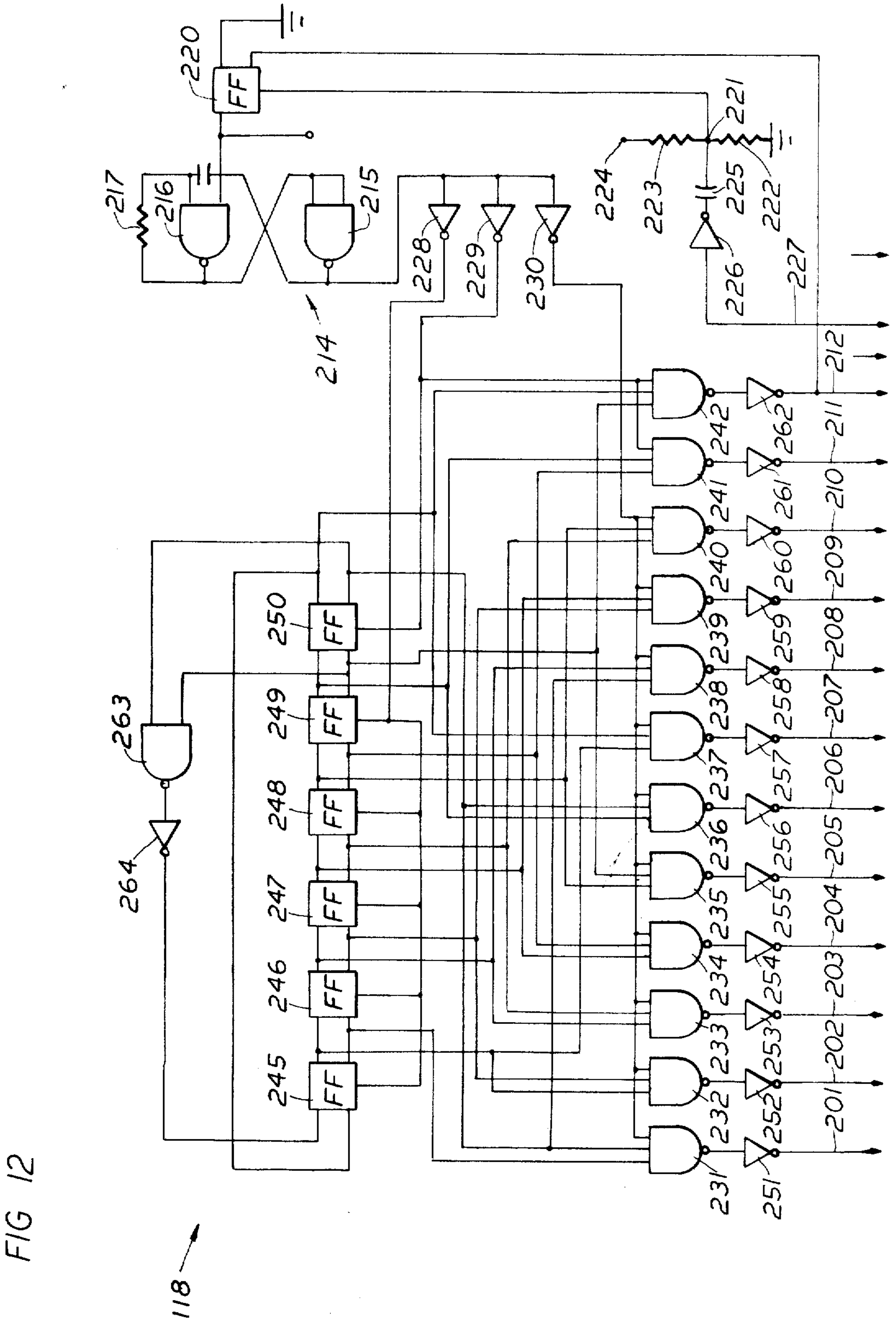
Figure 13:
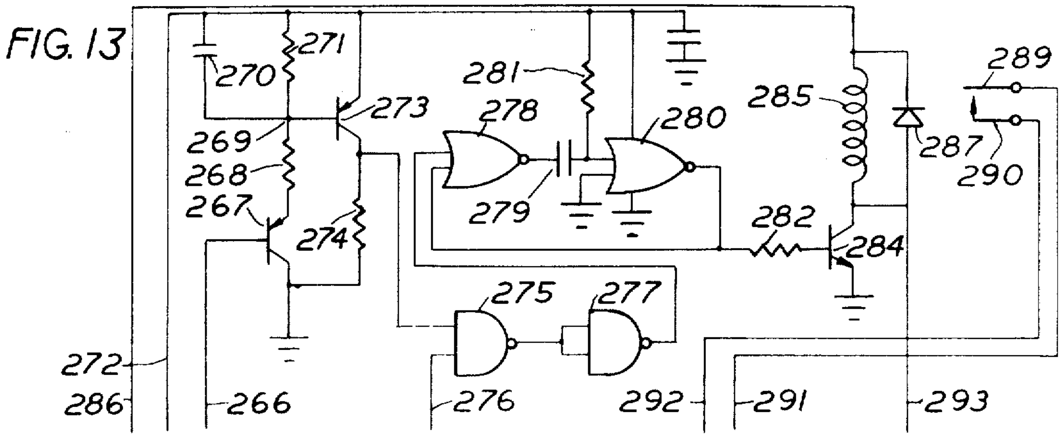
Figure 15:
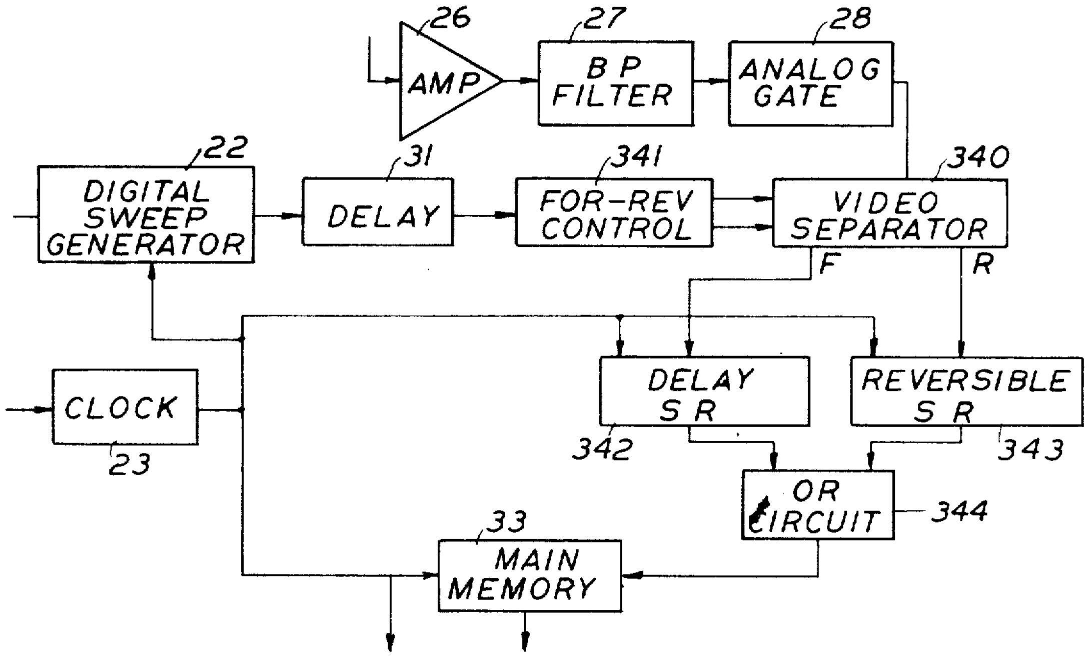
Figure 14:
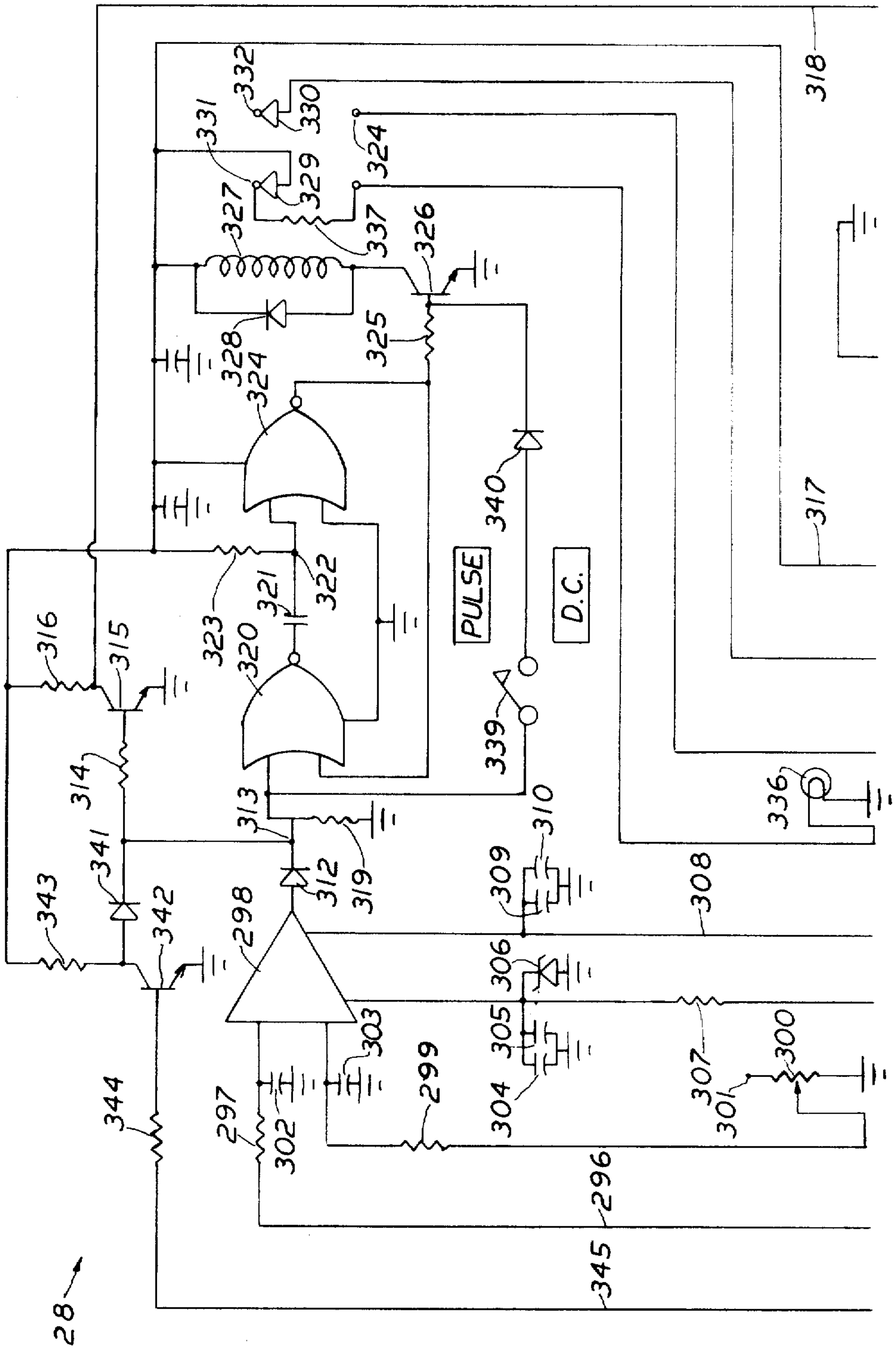
Figure 16:
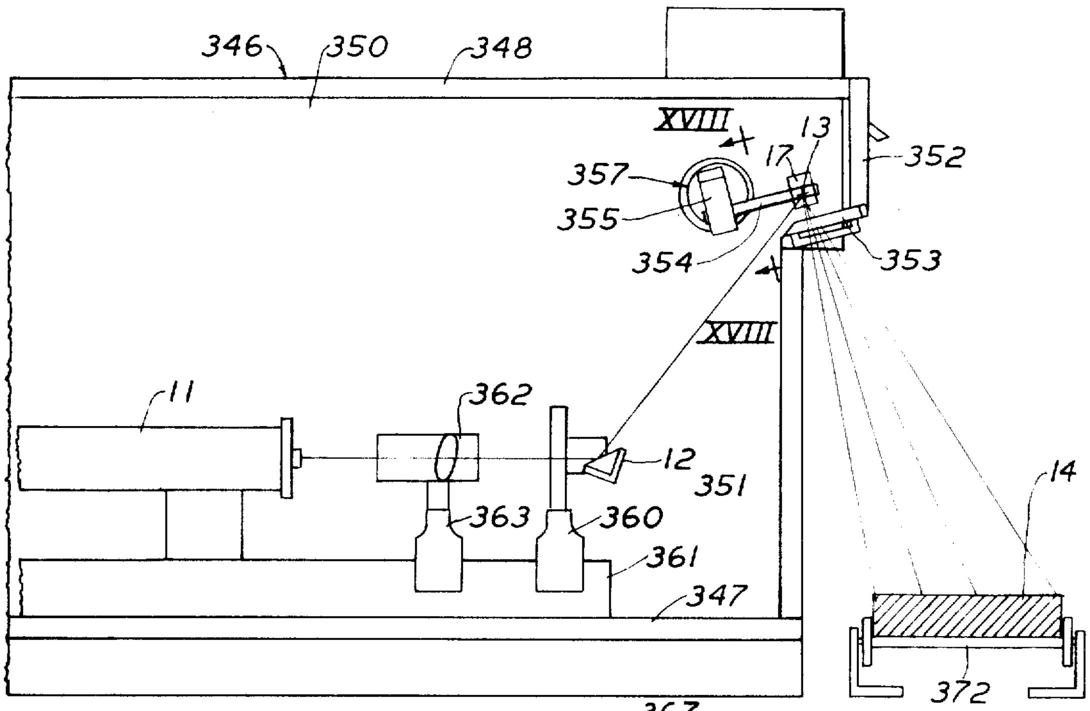
Figure 17:
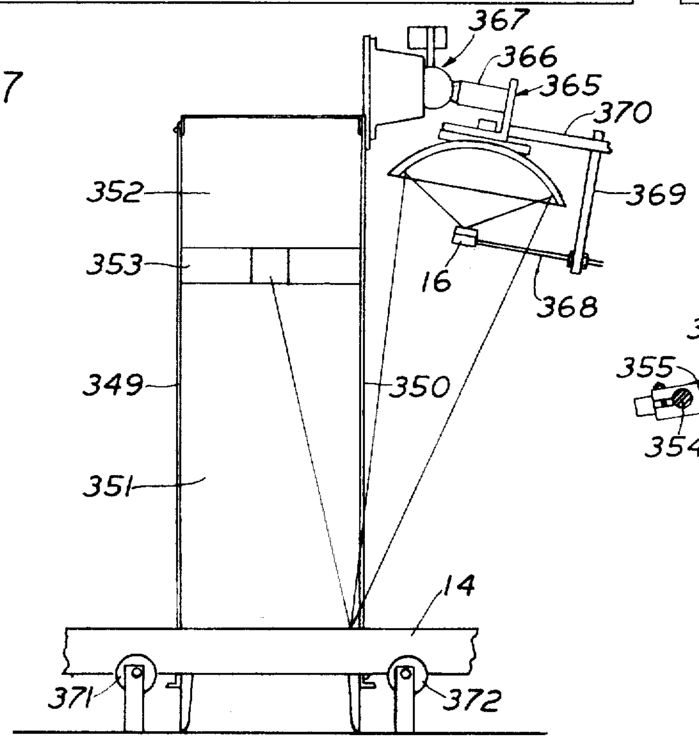

FIGS. 10 and 11 diagrammatically illustrate the operation of the connections shown in FIG. 9;

FIG. 12 is a circuit diagram of a flaw count sequencer circuit of the system;

FIG. 13 is a circuit diagram of an output circuit of the system;

FIG. 14 is a circuit diagram of an analog gate circuit of the system;

FIG. 15 is a schematic diagram of a modified circuit arrangement for utilizing reverse scan as well as forward scan information;

FIG. 16 is a side elevational view showing a laser and mirror housing, with a side wall removed, and showing the support of a part in relation thereto;

FIG. 17 is a front elevational view of the structure shown in FIG. 17; and

Figure 18:
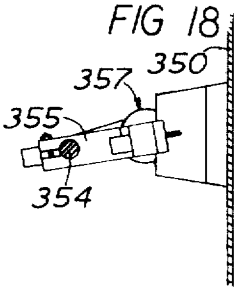

FIG. 18 is a sectional view, on an enlarged scale, taken substantially along line XVIII—XVIII of FIG. 16.

Reference numeral 10 generally designates an automatic testing system constructed in accordance with the principles of the invention. The system 10, as shown diagrammatically in FIG. 1, comprises a laser 11 which develops a narrow beam projected to a stationary mirror 12, thence to an oscillating scanning mirror 13 and thence to the surface of a part 14 under test. Light from the surface of the part 14 is collected by a mirror 15 and focused on a photocell 16.

The part 14 may, for example, be a steel billet which is magnetized with magnetic particles being applied over the surface thereof to be concentrated over surface and sub-surface cracks or flaws in the part. The particles preferably contain a fluorescent pigment which is highly absorptive at the wave length of the laser beam and which emits energy at a longer wave length. By way of example, the laser 11 may be a helium-cadmium laser generating an intense concentrated light beam at a wave length of 4416 angstroms and the fluorescent pigment may emit a yellow green light.

The scanning mirror 13 is oscillated by an electromechanical drive unit 17 ro move the scanning spot back and forth transversely across the part 14, in forward and reverse directions as indicated by arrows 18. At the same time, the part 14 is moved by a drive mechanism 19 in a longitudinal direction as indicated by arrow 20. Thus, the entire upper surface of the illustrated part may be scanned.

Details of the support of the laser, mirrors, photocell and the part are illustrated in FIGS. 16–18, as described hereinafter.

The scanning mirror drive unit 17 is energized from a control circuit 21 which is controlled from a digital sweep generator 22, supplied with pulses from a clock 23. The digital sweep generator 22 generates a staircase wave form, increasing in steps until an internal counter counts a predetermined number of clock pulses and then reverses to decrease in steps until the internal counter again counts the predetermined number of clock pulses, then again reversing to again increase in steps, and so on. By way of example, the predetermined count number may be 1,000 and the clock may supply pulses at a rate of from 0.4 to 1.4 MHz. Thus, the frequency of the staircase function may be from 200 to 700 HZ. The inertia of the drive unit 17 and the mirror 13 is such that there is no response to individual step functions at high clock rates in the staircase and there is a smooth change in position of the mirror 13 and corresponding smooth change in position of the laser beam spot. Preferably, the clock 23 may be controlled from a frequency control circuit 24, controlled from the drive mechanism 19 in a manner such that the rate of oscillation of the mirror 13 is directly proportional to the velocity of movement of the part 14.

When the beam traverses a flaw indication, such as a longitudinal crack, for example, a light pulse is generated which is collected by the mirror 15 and applied to the photocell 16 to generate an electrical pulse. The output of the photocell 16 is amplified by an amplifier 26 and applied through a bandpass filter 27 to an analog gate circuit 28 which generates a pulse in response to each pulse applied thereto having an amplitude above a certain threshhold value. Pulses from the analog gate circuit 28 are applied through a video separator circuit 29 which passes only the information pulses generated during the forward scanning movement of the scanning spot. The circuit 29 is controlled from a forward scan gate 30 which is controlled from the sweep generator 22 through a delay circuit 31. Delay circuit 31, which may be in the form of a monostable multivibrator, for example, introduces a fixed delay to compensate for a time lag or phase delay between the output of the digital sweep generator 22 and the corresponding movement of the scanning mirror 13, arising from the inertia of the drive unit 17 and the mirror 13. The delay may, of course be adjusted according to operating conditions but normally the required delay is substantially constant even when the rate of oscillation of the mirror 13 is varied over a wide range.

The forward scan information pulses from the video separator circuit 29 and clock signals from a gate circuit 32 are applied to a main memory 33, the gate circuit 32 being operative to apply the clock pulses only during the forward scan gate. The main memory 33 is connected to an auxiliary memory 34 which is connected to a decoder including parallel to time-sequential converters and pre-settable counters controlled from a selector switch 36. The output of the decoder 35 is applied to an output circuit 38. Gated clock signals are applied from the gate circuit 32 to the auxiliary memory 34 and also to the decoder 35.

Figure 2:
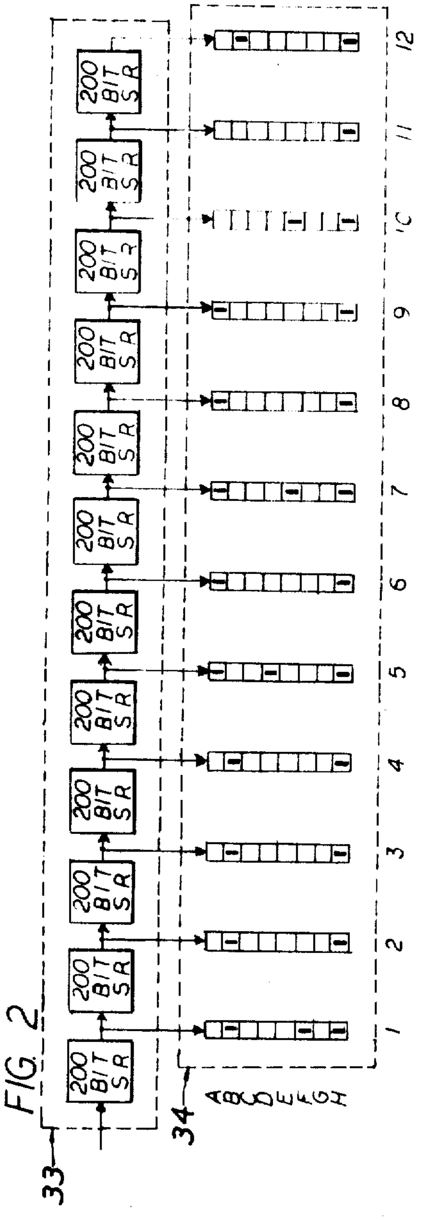

FIG. 2 illustrates diagrammatically the general form of the main and auxiliary memories 33 and 34 the details of which are described hereinafter. The main memory 33 of the illustrated system comprises twelve shift-register units connected serially, each having a 200 bit capacity, thus providing a total storage capacity of 2,400 bits. The auxiliary memory 34 comprises 12 sets of shift-register stages respectively connected to the shift-register sections of the main memory, each set comprising eight stages connected serially. Such auxiliary memory shift-register stages form a matrix which is arranged electrically in eight rows and 12 columns, the columns respectively corresponding to successive forward scans. The row position within each column corresponds to the position of an inhomogeneity indication in the corresponding forward scan. During each forward scan, 200 clock pulses are applied to the shift-register units of the main memory 33 and the shift-register stages of the auxiliary memory 34.

Figure 3:
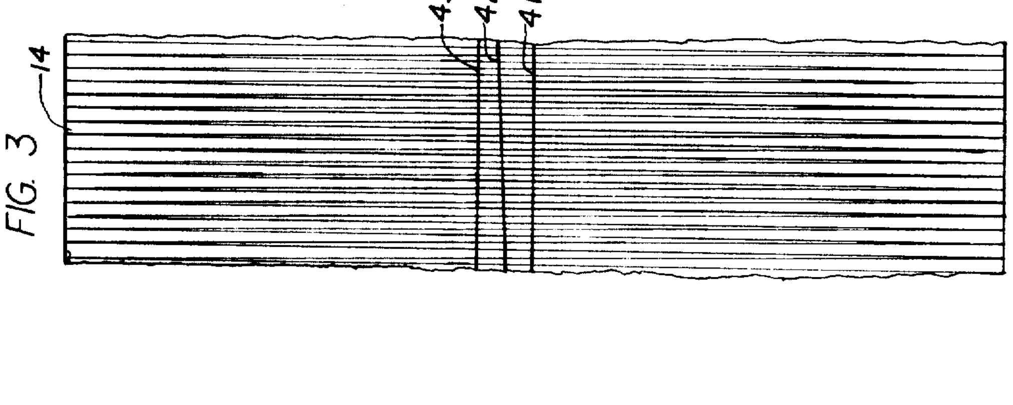

FIG. 3 shows diagrammatically a portion of the surface of the part 14 which is moved in a longitudinal direction indicated by arrow 39. The zig-zag path followed by the laser beam spot is indicated in light lines the forward scan direction being indicated by arrow 40. The part 14 as illustrated may have three seams or cracks producing indications 41, 42 and 43 extending generally longitudinally, indications 41 and 43 being parallel to the side edges of the part and indication 42 being at a small angle relative to a direction parallel to the side edges of the part.

A pulse generated in response to traversing of the parallel indication 41 by the spot during a forward scan is entered at a certain time into the first 200 bit shift-register unit of the main memory 33. A pulse generated by a traversal of the same parallel indication 41 at a corresponding time during the next forward scan will be entered into the first unit of the main memory and at the same time, the initial pulse will exit from the first unit and enter the second unit of the main memory, and also the A row shift-register stage of the first column of the auxiliary memory 34. At a certain time in the eleventh forward scan thereafter, information pulses will simultaneously exit from all shift-register units of the main memory to be entered into the A row shift-register stage of the auxiliary memory. Eight clock pulses later, such pulses will enter the H shift-register stage of the auxiliary memory. At this time, ones are stored in all H row shift-register stages, as diagrammatically illustrated in FIG. 2. The information pulses produced by the indication 42, due to its inclination, are not all stored in the same row position, four being stored in the B row of columns 1–4, and five being stored in the A row of columns 5–9. The remaining three pulses are at this time stored in the last stage of the last three shift-register units of the main memory 33. Additional pulses may be stored from random background indications, as shown.

Figure 4:
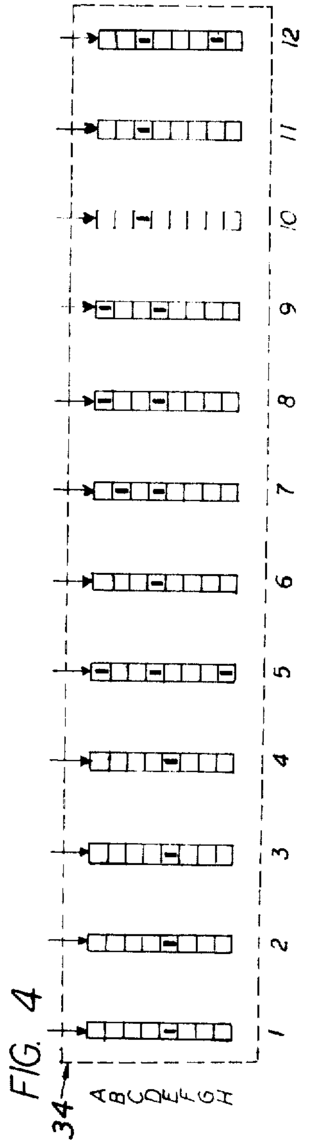

FIG. 4 illustrates the condition of the auxiliary memory 33 after three additional clock pulses are applied. Here, all of the pulses of the parallel indication 41 have left the auxiliary memory and all of the pulses from the angle indication 42 are in the auxiliary memory 34 being stored in the E row of columns 1–4, the D row of columns 5–9 and the C row of columns 10–12.

Figure 5:
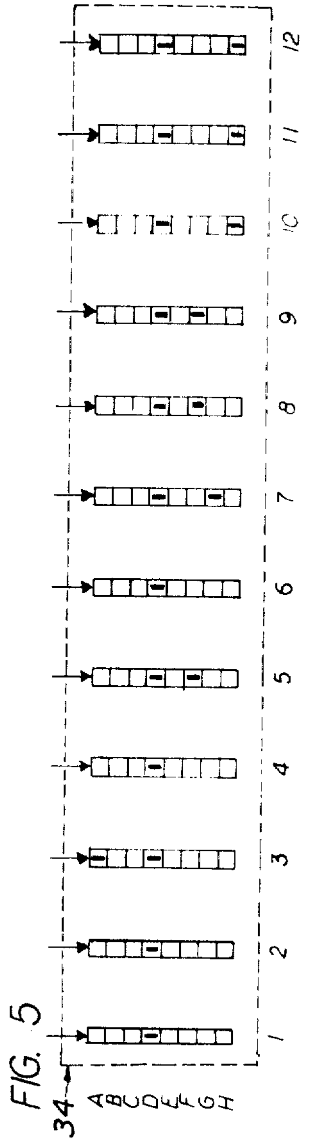
FIG. 5 is a view similar to FIG. 4, illustrating the storage of information in the auxiliary memory at a still later point in time.

FIG. 5 illustrates the condition after five more clock pulses are applied. All of the pulses from the angle indication 42 have left the auxiliary memory, except for three stored in the H row of columns 10–12 and pulses from the parallel indication 43 are in the D row position in all columns.

It will be noted that at any given time, indications from only a small portion of the total area of the part are in the auxiliary memory 34 but during the scanning operation, information pulses from all parts of the scanned area pass through the auxiliary memory 34.

As hereinafter described in detail, the decoder 35 is arranged to sense the coincidence of storage of signals in predetermined ones of the shift-register stages of the auxiliary memory 34, with interconnections being made according to the type of part being tested. In testing steel billets, for example, it is generally desirable to detect seams which extend generally longitudinally, parallel to the side edges or within a relatively small angle relative to a direction parallel to the side edges. By making connections to all stages of the same row, it is possible to detect any seam laying parallel to the side edges and by appropriate connections, it is also possible to detect any seam lying at an angle to a direction parallel to the side edges, within limits determined by the number of stages of the matrix and the velocity of the scanning movement. In addition, the decoder 35 is arranged to detect a condition in which signals are stored in only a certain percentage of the stages selected. For example, a "stitched" line may result in the storage of signals only in the H row stages of columns 1–3, 6, 7, 9, 10 and 12, i.e. only in eight of the 12 H row stages, but it is generally very desirable to detect such a condition because it may indicate a serious defect. By adjustment of the selector switch 36, which controls pre-settable counters within the decoder 35, the number of stored signals required to generate an output signal may be adjusted from four to twelve.

It is noted that the system is highly discriminatory with respect to noise signals or signals produced from random background indications. With appropriate settings, the probability of having random indications which produce an output signal is remote while at the same time, the system reliably generates an output signal in response to indications of a serious defect.

Figure 6:
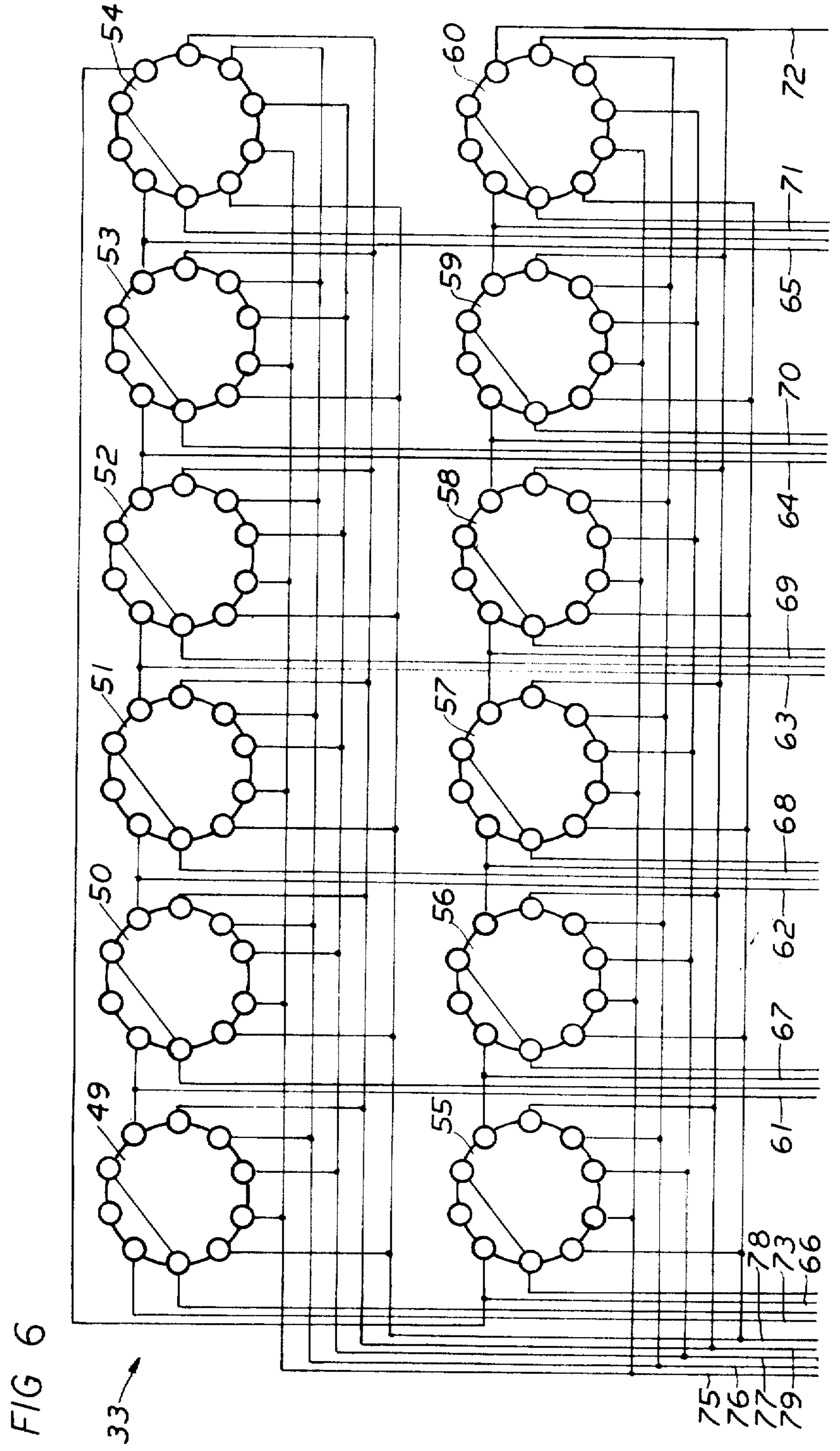
FIG. 6 is a circuit diagram of the main memory of the system.

FIG. 6 is a circuit diagram of the main memory 33 which comprises twelve identical shift-register units 49–60, each of which is a 200 bit MOS (metal oxide semiconductor) LSI (large scale integration) shift-register. Output terminals of the units 49–60 are connected to output lines 61–72, the output terminals of units 49–59 being also connected to input terminals of the units 50–60, while an input terminal of the unit 49 is connected to a line 73, coupled to the output of the video separator circuit 29. Shift pulse input terminals of all units are connected through lines 75 and 76 to an output from the gate circuit 32 which during the forward scan, supplies a two phase clock gate required for operation of the MOS units. Supply voltages (plus and minus 15 volts relative to ground) are supplied to all units through lines 77 and 78 while a circuit ground connection is made to all units from a line 79. Each of the units has a terminal providing access to the 100th bit and the additional illustrated lines are connected thereto, but are not used in the illustrated system.

Figure 7:
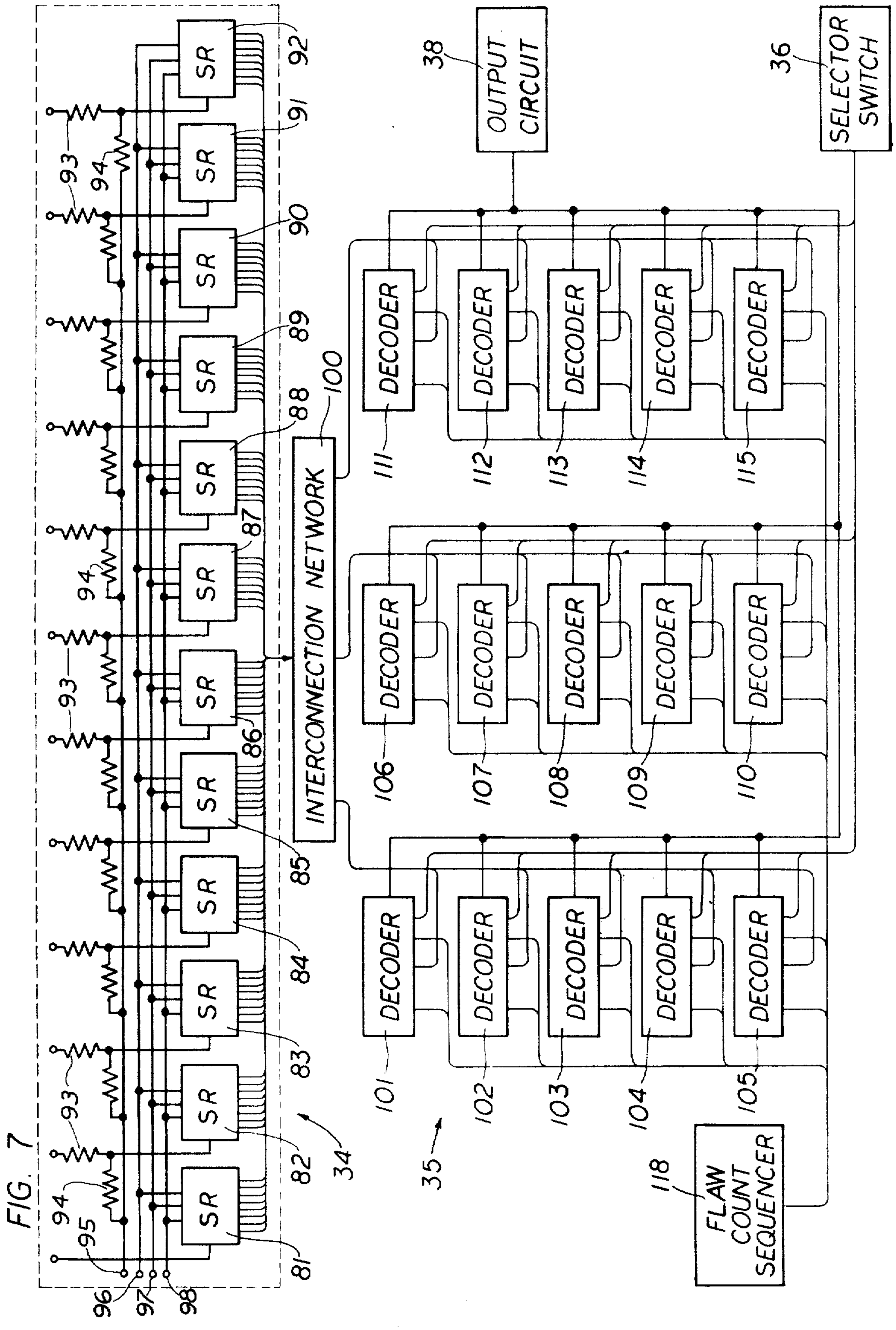
FIG. 7 is a schematic diagram of the auxiliary memory and decoder and associated circuits of the system.

FIG. 7 is a circuit diagram of the auxiliary memory 34 and a block diagram of the decoder 35. The auxiliary memory 34 comprises 12 shift-register units 81–92 each of which has eight stages and each of which may preferably be a TTL (transistor-transistor-logic) integrated circuit package. Inputs of the units 81–92 are connected to the main memory 33. To provide proper interface couplings, the inputs of units 82–92 are connected through resistors 93 to the appropriate outputs of the main memory 33 and through resistors 94 to a terminal 95 to which a minus 15 volt supply voltage may be applied. A terminal 96 is connected to a plus 5 volt power supply, a terminal 97 is connected to the gate circuit 32 to receive gated clock pulses and a terminal 98 is connected to ground, terminals 96, 97 and 98 being connected to appropriate terminals of all units 81–92.

Each of the units 81–92 has eight output terminals thus providing a total of 96 output terminals which are connected through an interconnection network 100 to terminals of 15 decoder circuit boards 101–115 which are connected to a flaw count sequencer 118, the selector switch 36 and the output circuit 38. In general, each of the decoder circuit boards 101–115 includes gate circuits having inputs connected through the network 100 to outputs of preselected outputs of the shift register units 81–92 according to a pattern to be recognized. After each clock pulse, a burst of high frequency pulses is applied to the gate circuits from the flaw count sequencer 118 to convert the information, applied in parallel, into a time series of pulses which are applied to a counter circuit in each decoder. If the number of pulses applied to any of the counters exceeds a number which is preselected by the selector switch 36, an output signal is applied to the output circuit 38.

Figure 8:
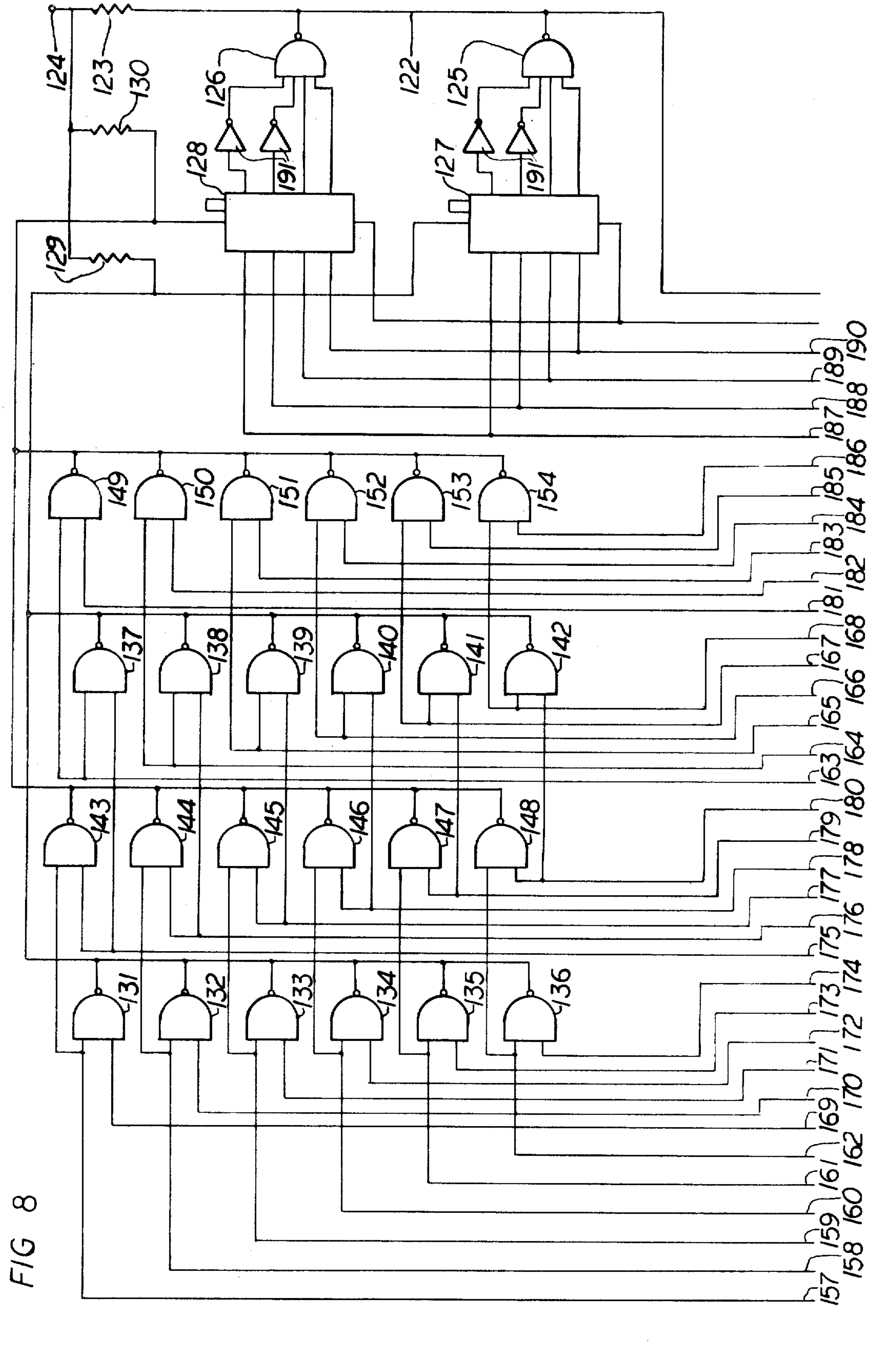
FIG. 8 is a circuit diagram of one of the decoder boards of the system.

FIG. 8 is a circuit diagram of the circuit board 101. The other circuit boards 102-115 may have a similar circuit. An output line 122 is connected through a resistor 123 to a plus 5 volt supply terminal 124 and to the outputs of two circuits 125 and 126 having inputs coupled to the output terminals of two counters 127 and 128, an output signal being developed when either the counters 127 or 128 registers a predetermined count which is selected by operation of the selector switch as hereinafter described.

Inputs of the counters 127 and 128 are connected through resistors 129 and 130 to the power supply terminal 124 and to the outputs of two groups of gate circuits, the input of counter 127 being connected to the output of one group of 12 gate circuits 131–142 and the input of counter 128 being connected to outputs of a second group of twelve gate circuits 143–156, each of the gate circuits 131–156 having two inputs. First inputs of the gate circuits 131–142 and first inputs of the gate circuits 143–156 are connected to twelve sample pulse input lines 157–168 to which a burst of twelve high frequency sample pulses is applied after each clock pulse. A first group of six information input lines 169–174 are connected to the second inputs of gates 131–136. A second group of information input lines 175–180 are connected to the second inputs of gates 137–142 and also to the second inputs of gates 143–148. A third group of input lines 181–186 are connected to the second inputs of gates 149–154.

The information input lines 169–186 are connected through the network 100 to predetermined output lines of the shift-registers 81–92 of the auxiliary memory 34. If "ones" are stored in all of the stages connected to lines 169–180, then stelve pulses will be applied to the counter 127 when the 12 sample pulses are applied sequentially to the lines 157–168. Similarly, if "ones" are stored in all of the stages connected to lines 175–186, then 12 pulses will be applied to the counter 128 when the 12 sample pulses are applied sequentially to the lines 157–168.

Thus the counter 127 can respond to one pattern of signals stored in the memory 34 and the counter 128 to a different pattern of stored signals. If the counters 127 and 128 are set to develop an output signal only in response to twelve counts, an output signal will be applied to the output circuit 38 if either or both patterns are complete but will not be developed if both patterns are less than complete, providing eleven or a lesser number of pulses. However, by control of the selector switch 36, the counters 127 and 128 may be set to respond to a number of pulses less than twelve, to respond to patterns which are less than complete.

In the illustrated system, the counters 127 and 128 are connected through lines 187–190 to the selector switch 36 to control the number of counts to develop an output signal. The counters 127 and 128 as well as the switch 36 are of types which are commercially available with which four connections are customarily made to the gates 126 and 126. Such connections allow counting only up to ten, however, and in order to count to at least twelve, a modification has been made by substituting inverters 191 for direct connections in the manner as illustrated, which allows counting from four to thirteen, rather than from one to ten pulses.

The connections through the interconnection network 100 are arranged according to the defect pattern to be detected and as one example, the connections may be such as to detect any straight line indication extending generally longitudinally and within a certain angle relative to a line parallel to the side edges of the part 14.

FIG. 9 is a diagram of a typical connection from the decoder 101 to the stages of the shift register units 81–92 of the auxiliary memory 34. In the diagram of FIG. 9, reference numeral 81A indicates the output line from the first stage of the shift-register unit 81, 85B indicates the output line from the second stage of the firth shift-register unit, 85, etc. FIGS. 10 and 11 illustrate diagrammatically the patterns detected. The counter 127 will respond to an indication along a line 192 in FIG. 10, at one angle, and the counter 128 will respond to an indication along a line 193, FIG. 11, at a different angle. Similar types of connections are made from the decoder circuit boards 102–115 to enable detection of indications of lines along various angles. It is noted that through the use of the common lines, such as the lines 175–180, connected to gates for two separate counters, the number of required connections is reduced. By using gates and inverters such as gates 194–196 and inverter 197–199, as illustrated in FIG. 9, the range of angles determined by each counter and associated circuitry is extended.

The connections to stages of the auxiliary memory shift-registers are preferably distributed in a manner such as to obtain uniform loading, so far as possible, and to avoid excessive loading of any stage.

In connection with FIGS. 10 and 11, it is also noted that the actual angles detected are dependent upon the speed of longitudinal movement of the part 14 relative to the speed of the transverse scanning movement of the scanning beam. Such speeds, the number of stages used in the auxiliary memory, the number of decoders and the matter of making interconnections in the network 100 are determined by practical considerations such as the type of part tested, the types of defects to be detected, the desired accuracy, etc. In the illustrated system, there are 15 decoder circuit boards each of which is operative to detect two patterns, so that a total of 30 patterns can be detected. The number of boards may be decreased or increased as required or desired. The illustrated arrangement is only one example of a practical application of the invention. It will be understood that to allow selective use of the system for different applications, the interconnection network 110 may include an X-Y patch board or the equivalent.

FIG. 12 is a circuit diagram of the flaw count sequencer 118 which functions to generate a burst of 12 sample pulses at a high frequency rate following each clock pulse applied to the memory circuits, such sample pulses being applied sequentially to output lines 201–212 which are connected to the sample pulse input lines 157–168 of the decoder board 101 and corresponding sample pulse input lines of the other decoder boards 102–115.

The sequencer 118 comprises an oscillator 214 in the form of a free running multivibrator formed by two gate circuits 215 and 216, the two inputs of gate circuit 215 being connected to the output of gate circuit 216 which is connected through a resistor 217 to one input of the gate 216, also connected through a capcitor 218 to the output of gate circuit 215. The second input of gate 216 is connected to an output of a flip-flop 220 having a set input connected to a circuit point 221 which is connected through a resistor 222 to ground, through a resistor 223 to a plus 5 volt supply terminal 224 and through a capacitor 225 to the output of an inverter 226 having an input connected to a line 227 to which clock pulses are applied from the gate circuit 32.

When a clock pulse is applied to the line 227, the flip-flop 220 is set and the gate 216 is enabled to allow the multivibrator 214 to operate at a frequency determined primarily by the values of resistor 217 and capacitor 218. The frequency may be on the order of 5 MHz, by way of example.

Output pulses developed at the output of gate 215 are applied through three inverters 228, 229 and 230 to inputs of 12 gates 231–242 and also to inputs of six J-K flip-flops 245–250 in the manner as shown. The outputs of gates 231–242 are connected through inverters 251-262 to the output lines 201–212. Flip-flops 245-250 are connected in cascade with the $\bar{Q}$ output of flip-flop 250 being connected to the K input of flip-flop 245 and with the $\bar{Q}$ output of flip-flop 250 being connected to an input of a gate 263 the output of which is connected through an inverter 264 to the J input of flip-flop 245. The other input of gate 263 is connected to the $\bar{Q}$ output of flip-flop 249.

With the connections shown the six flip-flops 245–250 operate as a "Johnson" counter and are shifted sequentially through twelve states in response to pulses applied from the multivibrator 214 and the gates 231–242 sequentially pass such pulses which are applied through the inverters 251–262 to the output lines 201–212. The final pulse on line 212 is applied to a reset input of the flip-flop 220, discontinuing operation of the multivibrator 214.

FIG. 13 shows the circuit of the output stage 38. An input line 266 is connected to the base of a transistor 267 having a grounded collector and having an emitter connected through a resistor 268 to a circuit point 269 which is connected through a capacitor 270 and a resistor 271 in parallel to a plus 5 volt supply line 272. Circuit point 269 is also connected to the base of a transistor 273 the emitter of which is connected to the line 272 and the collector of which is connected through a resistor 274 to ground and to one input of a NAND gate 275 having a second input to which a strobe gate signal is applied through a line 276. The output of the NAND gate 275 is coupled through a second NAND gate 277, operative as an inverter, to one input of a NOR gate 278. The output of the gate 278 is connected through a capacitor to one input of a second NOR gate 280 which is connected through a resistor 281 to the line 272. The output of the gate 280 is connected to the second input of the gate 278 and is also connected to a resistor to the base of a transistor 284, the emitter of which is grounded and the collector of which is connected through a relay coil 285 to a plus 12 volt power supply line 286, a diode 287 being connected in parallel with the coil 285.

When relay coil 285 is energized, a contact 289 is engaged with a fixed contact 290, contacts 289 and 290 being connectable through lines 291 and 292 to a suitable indicating device or to a device for making a part to indicate a defect. A line 293, connected to the collector of transistor 284, may be connected to a suitable indicating light circuit.

In the operation of the output circuit 38, the line 266, which is connected to the output line 122 of the decoder 101 and similar output lines of all the other decoders 102–115, is normally "high," at a potential of approximately 5 volts positive. In response to operation of either of the counters 127 or 128 of the decoder 101, or any of the counters of the other deciders, the line 266 goes "low" to approximately ground potential, causing the transistor 267 to conduct and, in turn, causing the transistor 273 to conduct to place the collector of transistor 273 at approximately 5 volts positive relative to ground and thus applying a high signal to one input of the gate 275. At a time coincident with the time period when any of the counters might be operated, i.e., during the sample pulse burst, a strobe gate signal is applied to the line 276 to apply a high signal to the second input of the gate 275. With both inputs of gate 275 high, the output thereof goes low and the output of gate 277 goes high. The output of gate 278 then goes low, applying through the capacitor 279 a low signal to the input of gate 280 which develops a high output applied through resistor 282 to the base of transistor 284, causing conduction thereof and initiating energization of the relay coil 285. When the output of the gate 280 goes high a high signal is thereby applied to the gate 278 to maintain the established condition. However, the capacitor 279 is gradually charged through the resistor 281 until the input of the gate 280 reaches a certain potential, at which time the output of the gate 280 goes low cutting off conduction through the transistor 284. Thus, the transistor 284 is energized for a time interval dependent upon the time constant of the circuit formed by capacitor 279 and resistor 281. The time constant may be on the order of 5 milliseconds, for example, sufficient to insure energization of the relay coil 285 for a time sufficient for closure of the contacts 289 and 290 and to insure energization of indicating and marking devices.

FIG. 14 is a circuit diagram of the analog gate 28. An amplified pulse from the band-pass filter 27 is applied through a line 296 and a resistor 297 to a plus input terminal of an operational amplifier 298 having a minus input terminal connected through a resistor 299 to the movable contact of a potentiometer 300 connected between ground and a power supply terminal 301, capacitors 302 and 303 being connected between the input terminals of amplifier 298 and ground. A minus supply terminal of the amplifier 298 is connected through capacitors 304 and 305 and a Zener diode 306 to ground and through a resistor 307 to a minus 12 volt supply. A plus supply terminal of the amplifier 298 is connected through a line 308 to a plus 12 volt supply and through capacitor 309 and 310 to ground.

In operation, the potentiometer 300, which may be physically located on a control panel, is adjusted to apply a certain voltage to the minus input of the amplifier 298 and when the amplitude of the input pulse applied through line 296 and resistor 297 exceeds the voltage determined by the setting of potentiometer 300, the amplifier 298 develops a positive output which is applied through a diode 312 to a circuit point 313, connected through a resistor 314 to the base of a transistor 315. The emitter of transistor 315 is grounded and the collector thereof is connected through a resistor 316 to a plus 5.5 volt supply line 317 and also to an output line 318.

When the positive output signal from the amplifier 298 is applied through diode 312 and resistor 314 to the transistor 315, a negative-going output pulse is developed on the line 318 which is coupled through the video separator circuit 29 to the input of the main memory 33 (line 73 in FIG. 6). The output pulse is of substantially fixed amplitude so long as the input signal exceeds the threshhold value determined by the adjustment of the potentiometer 300.

For adjustment and monitoring of the circuit operation, means are provided responsive to any output signal from the amplifier 298 for developing an output signal of substantial duration, for directly driving indicating means. In accordance with this feature, circuit point 313, which is connected through a resistor 319 to ground is connected to one input of a NOR gate 320 having an output connected through a capacitor 321 to a circuit point 322 which is connected through a resistor 323 to the supply line 317 and also to an input of a second NOR gate 324. The output of the gate 324 is connected to a second input of the gate 320 and also through the resistor 325 to the base of a transistor 326 the emitter of which is grounded and the collector of which is connected through a relay coil 327 to the supply line 317, a diode 328 being connected in parallel with the coil 327. A pair of contacts 329 and 330, normally engaged with contacts 331 and 332 are moved into engagement with contacts 333 and 334 when the coil 327 is energized.

The gates 320 and 324 and associated circuitry operate in the same manner as the gates 278 and 280 and associated circuitry of the output circuit 338 (FIG. 13), as above described, a short pulse applied from the amplifier 298 being sufficient to cause conduction of the transistor 326 and energization of the coil 327 for a time interval of substantial duration. Contact 329 is connected to the supply line 317 while contact 333 is connected through a line 335 and through a lamp 336 to ground. Lamp 336 may be physically located on a suitable indicating panel, and is energized in response to energization of the coil 327. A resistor 337 may be connected between relay terminals 331 and 333 to maintain a certain current through the lamp 336 and to permit it to respond more rapidly to full operating current. Relay contacts 330 and 334 may be connected to other external indicating circuitry.

The threshhold potemtiometer 300 should normally be adjusted to a position such that the relay coil 327 is occassionally energized in response to random indications but if the relay coil 327 is continuously energized or energized a considerable portion of the time, it indicates that the adjustment of the threshhold potentiometer 300 is too high. To permit a check to determine whether the output of the amplifier 298 is continuous, a switch 339 may be closed, connecting circuit point 313 to the base of transistor 326 through a diode 340.

For additional checking of the circuit, operation, circuit point 313 is connected through a diode 341 to the collector of a transistor 342 which is connected through a resistor 343 to the supply 317, the emitter of transistor 342 being grounded and the base thereof being connected through a resistor 344 to a line 345 to which an externally developed test signal may applied. Thus, the operation of the illustrated circuit may be checked independently of the amplifier 298.

The band-pass filter 27, the circuit of which is not illustrated in detail, may preferably comprise an input line selectively connectable either directly or through four "upper corner" low pass filters having cut-off frequencies of 10 KHz, 20 KHz, 50 KHz and 100 KHz to an intermediate connection line selectively connectable either directly or through four "lower corner" high pass filters having cut-off frequencies of 20 Hz, 200 Hz, 1 KHz and 10 KHz to an output line connected through an amplifier of selectable sensitivity to the input of the analog gate 28. Each of the high and low pass filters may comprise an operational integrated circuit amplifier and a resistance-capacitance network. Filtering is desirable in many application such as, for example, where the ambient light has supply line frequency variations and in applications where high frequency noise components may be a problem.

FIG. 15 illustrates a modified arrangement in which signals from the analog gate circuit 28 are fed to a video separator 340 controlled by a forward-reverse control circuit 341 which is supplied with signals from the digital sweep generator 22 through the delay circuit 31. The video separator 340 is so controlled that information signals developed during the forward movement of the scanning spot are fed to a delay shift-register 342 while information signals develop during the reverse scan are fed to a reversible shift-register 343, clock signals being supplied to both shift-registers 342 and 343. The reversible shift-register 343 is controlled from the forward-reverse control circuit 341 in a manner such that during each foward scan, the signals entered into the register 343 during the preceding reverse scan are fed out of the register 343 in referse order. Thus, the last bit of information fed into the shift-register 343 during the reverse scan is the first bit out during the next forward scan and the first bit entered into the register 343 during the reverse scan is the last bit fed out during the next forward scan. Signls from the shift-registers 342 and 343 are combined in an OR circuit 344 and applied to the main memory 33. In this arrangement, it is not necessary to gate the clock signals to the main memory and the clock signals may be fed thereto continuously.

It is noted that during the reverse, when signals are being fed into the register 343, signals from the preceding forward scan are leaving the shift-register 342 and entering the main memory 33 and, similarly, when during the forward scan, when signals are entering the shift-register 342, they are leaving the shift-register 343. Thus they are combined in proper time sequence. In addition, due to the reversal of the reverse scan operation, they are combined and entered into the shift-registers of the memory to be properly oriented in the auxiliary memory 34 in relation to the position of the defect indications on the surface of the part 14.

Figure 1:
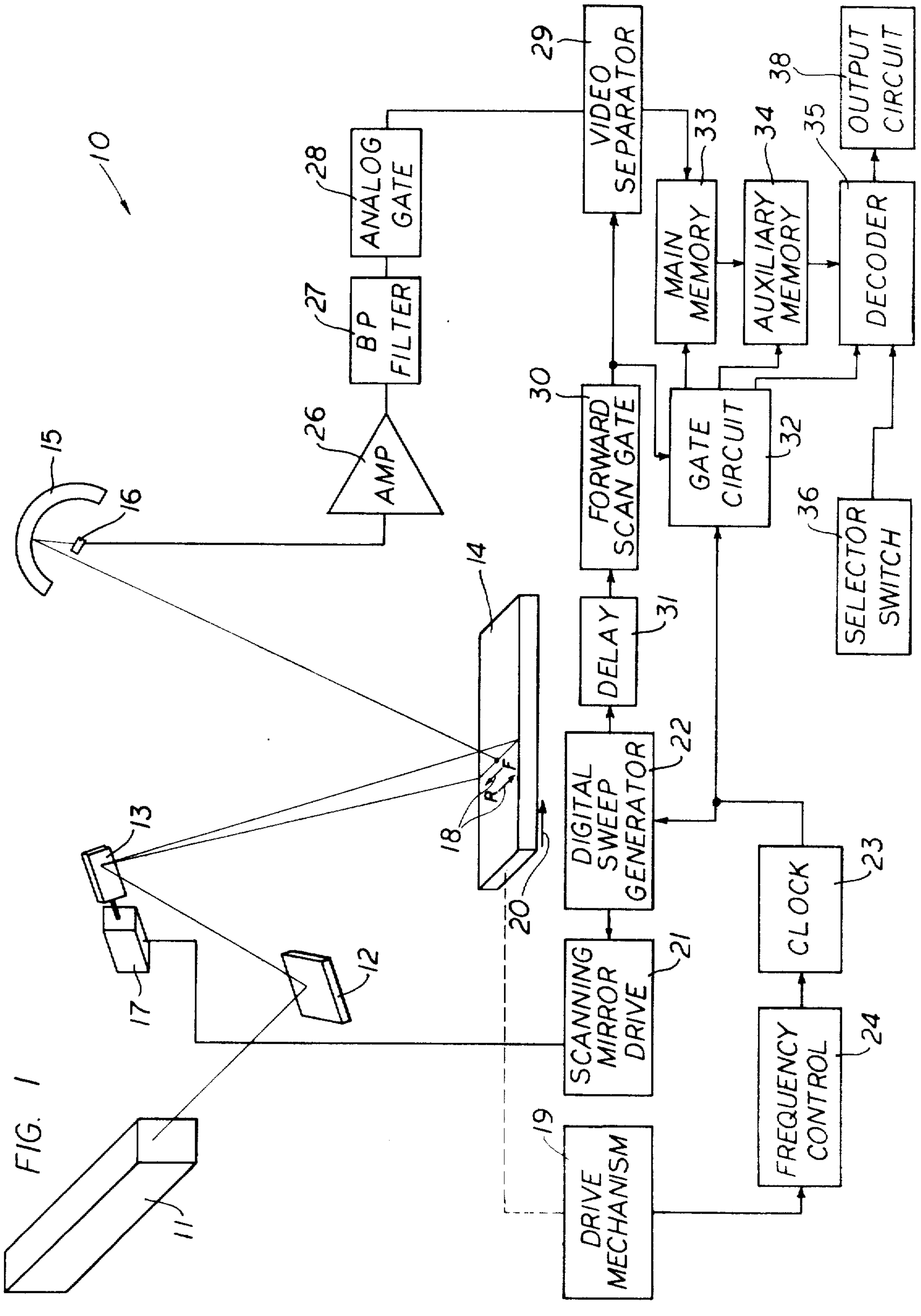

The arrangement of FIG. 15 has the advantage that all of the information obtained during the scanning operation is entered into the memories and processed by the pattern recognition circuitry. It does have a disadvantage, however, in requiring a very high degree of linearity in the operation of the sweep generator and in the resulting movement of the scanning mirror. In most application, it is preferable to use an arrangement such as shown in FIG. 1 and to use higher scanning speeds.

FIG. 16 is a side elevational view showing the support of the laser 11 and mirrors 12 and 13 in a housing generally designated by reference numeral 346 and showing the support of the part 14 in relation thereto. The housing 346 comprises a bottom wall structure 347, a top wall structure 348 and a pair of side walls 349 and 350, side wall 349 being removed in FIG. 16. The housing 346 further includes a front end wall structure including a lower vertical portion 351, an upper vertical portion 352 outwardly offset from the lower portion 351 and an intermediate generally transversely extending portion 353 between the upper end of the portion 351 and the lower end of the portion 352. Portion 353 has an opening for passage of the laser beam therethrough, from the mirror 13 to the upper surface of the part 14. The electromechanical drive unit 17 which supports the mirror 13, is carried by one end of a rod 354 the other end of which is clamped in the bifurcated end of a post 355, clamping of the rod 354 being controlled by a screw 356. The post 355 is supported from an adjustable ball joint support structure 357 which is secured to the side wall 350. With this arrangement, the position of the drive unit 17 may be accurately adjusted.

The mirror 12 is adjustably mounted on a support 360 which is adjustably mounted on a fixed support 361 on which the laser 11 is supported. A suitable lens unit 362, disposed between the laser 11 and the mirror 12, may be carried by an adjustable support 363 mounted on the fixed support 361.

The collector mirror 15 is carried by a support structure 365 on a post 366 which is supported from the housing 346 through an adjustable ball joint support 367. The photocell 16 is supported on a rod 368 adjustably carried by rod 369 on an arm 370 carried by the support structure 365.

The part 14, as schematically shown, may be supported for longitudinal movement by means including a pair of rowers 371 and 372 journalled on suitable supports. A suitable drive motor may be coupled to one or more of the support rowers for the part 14, to form the drive mechanism 19.

With the support of the laser 11, mirrors 12, 13 and 15 in the photocell 16 as shown, their relative positions can be accurately adjusted for proper scaning of the part 14. It is also noted that the housing 346 may be substantially dust tight to minimize interference with the laser beam, which may be quite narrow, by dust particles. It is noted that although, as described above, the indications may be desirably produced by magnetic particles associated with a suitable flourescent pigment, the indications to be scanned may be otherwise produced or may be cracks or the like in the surface of a part, having reflecting qualities with respect to the light of the laser, differing from the normal surface characteristic of the part. If the surface of the part is polished, a crack which appears as a black line to the eye does so because it absorbs or scatters the light more than the polished surface, and with the laser scan, the output of the photocell may be in the form of a negative pulse produced as the laser spot crosses the crack. With suitable processing, such negative pulses may be entered into the memories. In other cases, a crack may appear as a bright indication relative to a darker background. In any case, the system can be used to detect cracks or other flaws capable of visual detection and by appropriate adjustment and selection of the decoding operation, those cracks, flaws or inhomogeneities of serious concern may be automatically detected. Also, it is noted that while the use of a laser is highly advantageous in many applications, because of the high resolution possible and because of the large depth of field obtained with the narrow beam, it is not necessary in some applications to use the laser light.

It will be understood that modifications and variations may be effected without departing from the spirit and scope of the novel concepts of this invention.

We claim as our invention:

1. In a system for non-destructive testing of a part for inhomogeneities therein, scanning means arranged to effect scanning of a region of the part in first and second directions generally transverse to each other to develop information signals indicating inhomogeneities therein, said scanning being performed in successive generally parallel scans in said first direction with each scan in said first direction being displaced in said second direction from the preceding scan in said first direction, memory means for receiving said information signals and including a plurality of multistage shift-register sections coupled in cascade, said shift register sections including an initial section and a final section and a plurality of intermediate sections with interconnections between sections for transfer of information from said initial section through said intermediate sections toward said final section, each of said shift register sections being in the form of a large scale integrated circuit including a predetermined number of stages starting with an input stage and ending with an output stage with interconnections between stages for transfer of information from said input stage toward said output stage, means coupling said scanning means to said input stage of said initial shift register section to apply information signals from said scanning means to said input stage of said initial shift register section, a clock signal source, means coupling said clock signal source to said shift register sections to apply a certain number of shift signals to all stages of all said shift register sections during each scan in each first direction to enter information from said scanning means into the stages of said initial shift register section with information stored in said initial and intermediate sections in previous scans in said first direction being shifted into corresponding stages of succeeding sections, and pattern recognition means coupled to said memory means for detecting coincidence of storage of information in relation to predetermined stages of said shift register sections.

2. In a system as defined in claim 1, said memory means including a main memory formed by said plurality of multi-stage shift register sections and an auxiliary memory including a plurality of additional multi-stage shift register sections, each of said additional shift register sections including a plurality of stages starting with an input stage and ending with an output stage with interconnections between stages for transfer of information from said input stage toward said output stage, means connecting output stages of said shift register sections of said main memory to input stages of said additional shift register sections of said auxiliary memory, means coupling said clock signal source to said additional shift register sections of said auxiliary memory to apply said certain number of shift signals to all stages of said additional shift register sections during each scan in said first direction, and means connecting said pattern recognition means to predetermined stages of said additional shift register sections of said auxiliary memory.

3. In a system as defined in claim 2, the output stage of all except the final one of said shift register sections of said main memory being directly coupled to the input stage of the succeeding shift register section of said main memory, and said certain number of shift signals being equal to said predetermined number of stages in each of said shift register sections of said main memory.

4. In a system as defined in claim 2, the number of stages in said auxiliary memory shift register sections being a small fraction of the number of stages in said main memory shift register sections.

5. In a system as defined in claim 4, each stage of each of said auxiliary memory shift register sections having an output terminal for connection to said pattern recognition means.

6. In a system as defined in claim 1, said pattern recognition means arranged for detecting a plurality of patterns of storage of information and including decoder means for each pattern having parallel connections to said memory means and being operative to develop corresponding serial trains of pulses, and counter means responsive to said trains of pulses to develop an outer signal in response to application of a certain number of pulses thereto.

7. In a system as defined in claim 6, said counter means being adjustable to permit adjustment of said certain member.

8. In a system as defined in claim 6, said memory means including a main memory formed by said plurality of multi-stage shift register sections and an auxiliary memory including a plurality of additioanl multi-stage shift register sections, each of said additional shift register sections including a plurlaity of stages starting with an input stage and ending with an output stage with interconnections between stages for transfer information from said input stage toward said output stage, means connecting output stages of said shift register sections of said main memory to input stages of said additional shift register sections of said auxiliary memory, means coupling said clock signal source to said additional shift register sections of said auxiliary memory to apply said certain number of shift signals to all stages of said additional shift register sections during each scan in said first direction, and means connecting said pattern recognition means to predetermined stages of said additional shift register sections of said auxiliary memory, said decoder means being connected to stages of said auxiliary memory shift register sections.

9. In a system as defined in claim 1, said scanning means comprising laser means for producing a narrow beam of coherent light, movable mirror means for impinging said beam in a movable spot for scanning a surface of the part, and information signal generating means including photoelectric means responsive to light reflected from said surface for generating said information signals.

10. In a system as defined in claim 9, sweep generator means responsive to clock signals from said clock signal source for generating a periodic sawtooth signal including forward and reverse direction portions with each forward portion being a staircase function corresponding to application of a predetermined number of clock signals, said mirror means including an oscillatable mirror, and electromechanical drive means responsive to said sawtooth signal and arranged to oscillate said mirror and to move said spot in forward and reverse scan directions in response to said forward and reverse direction portions of said sawtooth signal.

11. In a system as defined in claim 9, said information signal generating means including analog gate means responsive to signals from said photoelectric means having an amplitude higher than a certain threshold value to generate information signals having a certain substantially fixed amplitude for application to said memory means, and means for adjusting said threshold value.

12. In a system as defined in claim 11, indicating means, and means responsive to any output signal from said analog gate means for applying a drive signal of substantial duration directly to said indicating means.

13. In a system as defined in claim 9, said information signal generating means including adjustable band-pass filter means.

14. In a system for non-destructive testing of a part for inhomogeneities therein, scanning means arranged to effect scanning of a region of the part to develop information signals indicating inhomogeneities therein, clock means for generating clock signals, memory means including a multiplicity of shift-register stages each arranged to store one bit of information, said memory means being responsive to said clock and information signals to store said information signals in said shift-register stages in patterns corresponding to the position and configuration of inhomogeneities in the part, the location of said patterns in said shift-register stages being progressively shifted in response to said clock signals, and pattern recognition means for responding to predetermined patterns, said pattern recognition means including for each pattern a decoder means having a parallel connection to predetermined shift-register stages and operative to develop a corresponding serial trains of pulses, and counter mean responsive to said trains of pulses to develop an output signal in response to application of a certain number of pulses thereto.

15. In a system as defined in claim 14, said counter means being adjustable to permit adjustment of said certain number.

16. In a system as defined in claim 14, said pattern recognition means including sample pulse generating means operative between clock signals for generating a train of sample pulses, said decoder means comprising a plurality of gates each having first and second inputs and having outputs connected to said counter, interconnecting means coupling said first inputs to predetermined shift-register stages, and means for applying said sample pulses sequentially to second inputs of said plurality of gates.

17. In a system as defined in claim 16, wherein at least two of the patterns detected by said pattern recognition means are such that a plurality of said shift-register stages, of said means are used in common for both of said patterns, said decoder means for said two of said patterns including a plurality of said gates in common, and counters having connections to the outputs of said common gates.

18. In a system as defined in claim 16, said interconnecting means including at least one OR gate means to couple one of said inputs to a plurality of said shift-register stages.

19. In a system for non-destructive testing of a part for inhomogeneities therein, laser means for producing a narrow beam of coherent light, mirror means for impinging said beam in a spot on a surface of the part, clock means for generating clock signals, sweep generator means responsive to said clock signals for generating a periodic sawtooth signal including forward and reverse direction portions with each forward portion being a staircase function corresponding to application of a predetermined number of clock signals, said mirror means including an oscillatable mirror, electromechanical drive means responsive to said sawtooth signal and arranged to oscillate said mirror and to move said spot in forward and reverse scan directions in response to said forward and reverse direction portions of said sawtooth signal, means including photoelectric means responsive to light reflected from said surface for generating information signals indicating inhomogeneities in the part, memory means responsive to said clock and information signals, and pattern recognition means connected to said memory means.

20. In a system as defined in claim 19, forward gate means for applying information signals to said memory means only during time periods corresponding to the application of said forward direction portions of said sawtooth signal.

21. In a system as defined in claim 20, delay means associated with said forward gate means for introducing a certain delay between the time of generation of said forward direction portions of said sawtooth signal and the application of said information signals to said memory means, said certain delay being substantially equal to a time lag between the generation of said forward direction portions and the corresponding movements of said oscillatable mirror.

22. In a system as defined in claim 19, said sweep generator means being reversible upon each application of said predetermined number of clock signals thereto with each of said reverse direction portions being a staircase function corresponding to application of said predetermined number of clock signals.

23. In a system as defined in claim 22, delay shift register means having a storage capacity equal to said predetermined number, reversible shift-register means having a storage capacity equal to said predetermined number, means operative during forward direction scan movements for entering said information signals into said delay shift-register means, means operative during said reverse direction scan movements for entering said information signals into said reversible shift-register means, said reversible shift-register means being operative during scan movements for feeding out said information signals in reverse order, and means for feeding the combine outputs of said delay and reversible shift-register means to said memory means.

24. In a system for non-destructive testing of a part for inhomogeneities therein, scanning means arranged to effect scanning of a region of the part in first and second directions generally transverse to each other to develop information signals indicating inhomogeneities therein, said scanning being performed in successive generally parallel scans in said first direction with each scan in said first direction being displaced in said second direction from the preceding scan in said first direction, said scanning means including means for producing a beam of light, mirror means for impinging said beam in a spot moved over the surface of a part and information signal generating means including photoelectric means responsive to reflected light, memory means including shift-register means, means operable in timed relation to each scan in said first direction to apply clock signals to said memory means, and pattern recognition means coupled to said memory means for detecting coincidence of storage of information in relation to predetermined points in said memory means, said information signal generation means including analog gate means responsive to signals from said photoelectric means having an amplitude higher than a certain threshhold value to generate information signals having a certain substantially fixed amplitude for application to said memory means, and means for adjusting said threshold value.

25. In a system as defined in claim 24, indicating means, and means responsive to any output signal from said analog gate means for applying a drive signal of substantial duration to said indicating means.

26. In a system as defined in claim 24, said information signal generating means further including adjustable band-pass filter means.

* * * * *